(12) United States Patent
Monty et al.

(10) Patent No.: US 6,260,359 B1
(45) Date of Patent: Jul. 17, 2001

(54) OFFSET DILUTION COMBUSTOR LINER

(75) Inventors: Joseph D. Monty, Boxford; John C. Jacobson, Melrose, both of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/431,465

(22) Filed: Nov. 1, 1999

(51) Int. Cl.$^7$ .................................................. F02C 3/14
(52) U.S. Cl. ................................................ 60/752; 60/732
(58) Field of Search ........................................ 60/752, 732

(56) References Cited

U.S. PATENT DOCUMENTS

| | | | |
|---|---|---|---|
| 2,709,338 | * 5/1955 | Morley et al. | 60/39.32 |
| 3,594,109 | * 7/1971 | Penny | 60/732 X |
| 4,893,475 | * 1/1990 | Willis | 60/732 |
| 6,070,412 | * 6/2000 | Ansart et al. | 60/752 X |
| 6,101,814 | * 8/2000 | Hoke et al. | 60/752 |

* cited by examiner

Primary Examiner—Charles G. Freay
Assistant Examiner—David J. Torrente
(74) Attorney, Agent, or Firm—Andrew C. Hess; Rodney M. Young

(57) ABSTRACT

A combustor liner includes a row of primary dilution holes disposed aft of a forward end thereof, and a row of secondary dilution holes disposed between the primary holes and an aft end of the liner. The secondary holes vary in size circumferentially to a maximum size offset circumferentially from the primary holes.

18 Claims, 3 Drawing Sheets

OFFSET DILUTION COMBUSTOR LINER

CROSS REFERENCE TO RELATED APPLICATION

The present invention is related to U.S. patent application Ser. No. 09/431,464, filed concurrently herewith by J.D. Monty et al, and entitled "Low Emissions Combustor."

BACKGROUND OF THE INVENTION

The present invention relates generally to gas turbine engines, and, more specifically, to combustors therein.

A turbofan gas turbine engine includes in serial flow communication a fan, compressor, combustor, and high and low pressure turbines which power the compressor and fan, respectively. Air is pressurized in the compressor and mixed with fuel in the combustor and ignited for generated hot combustion gases which rotate the turbines to power the fan and compressor.

In powering an aircraft in flight, the turbofan engine is operated at various power levels between idle and maximum power, with an intermediate cruise power level therebetween. Combustor performance affects the entire design of the engine. The combustor must be suitably sized for obtaining the desired maximum power from the engine. The combustion gases discharged to the turbines must have suitable circumferential and radial temperature distributions quantified by conventional pattern and profile factors.

Combustor performance is also controlled for minimizing undesirable exhaust emissions such as smoke, unburned hydrocarbons, carbon monoxide (CO), and nitrogen oxides (NOx). The levels of these exhaust emissions are directly affected by the fuel to air ratio of operation of the combustor from lean, to stoichiometric, and to rich. Tradeoffs in the relative amounts of these exhaust emissions are commonly required over the various power settings of the engine.

Furthermore, the combustor must also be designed for preventing lean blowout, as well as permitting altitude re-starting when necessary.

Accordingly, modem combustor design requires consideration of various competing objectives to provide stable operation of the combustor over various power levels, while minimizing undesirable exhaust emissions.

One turbofan aircraft engine enjoying commercial success is the CF34-3A engine manufactured and sold for many years in this country by the General Electric Company. This engine includes a single annular combustor having film cooled outer and inner liners. The liners include two rows of primary and secondary dilution holes which affect exhaust emissions and pattern and profile factors. The dilution holes cooperate with a single row of carburetors each having a central fuel injector in a swirl cup mounted in an annular dome at the forward ends of the liners.

The dilution holes are configured with two primary holes per swirl cup and four secondary holes per cup. Half of the primary holes are axially aligned with the centerlines of corresponding swirl cups, and half the primary holes are circumferentially offset at the mid-cup position between adjacent cups.

The four secondary dilution holes per cup include a large hole of maximum size coaxially aligned with a corresponding primary hole and swirl cup. Three remaining secondary holes per cup have a uniform small size, with one hole being aligned at the mid-up circumferential position, and the two remaining small holes being aligned at the ¼ and ¾ circumferential positions.

In this way, the hot streaks associated with the corresponding swirl cups are diluted with air from the corresponding primary and secondary dilution holes axially aligned therewith. The additional secondary dilution holes further control the introduction of dilution air for obtaining a generally uniform circumferential pattern factor at the combustor outlet.

The outer primary holes are larger than the inner primary holes, with the small secondary holes of the outer liner being smaller than the small secondary holes of the inner liner. The large secondary holes of both liners have the same size. In this way, the differently sized primary and secondary holes in the outer and inner liners control dilution air introduction into the combustor for additionally controlling the radial profile factor at the combustor outlet.

In the continued development of the CF34 turbofan engine, a larger combustor is desired for increasing the output power from the engine. However, a larger combustor cannot merely be scaled up version of the −3A combustor in view of the interdependence of the combustor components, combustion gases, and cooling and dilution air.

Furthermore, the larger combustor has additional burning volume for permitting re-starting at higher altitudes than the −3A combustor. Yet further, more stringent exhaust emission requirements are required for the larger combustor.

Since the larger combustor is capable of producing more combustion gases, an increase in corresponding exhaust emissions is a design concern. In particular, the risk of increased NOx emissions is a significant design factor which must be evaluated in conjunction with the overall performance of the larger combustor.

Accordingly, it is desired to provide the larger combustor with improved dilution air for limiting increase in exhaust emissions, such as NOx, while obtaining acceptable combustor performance.

BRIEF SUMMARY OF THE INVENTION

A combustor liner includes a row of primary dilution holes disposed aft of a forward end thereof, and a row of secondary dilution holes disposed between the primary holes and an aft end of the liner. The secondary holes vary in size circumferentially to a maximum size offset circumferentially from the primary holes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
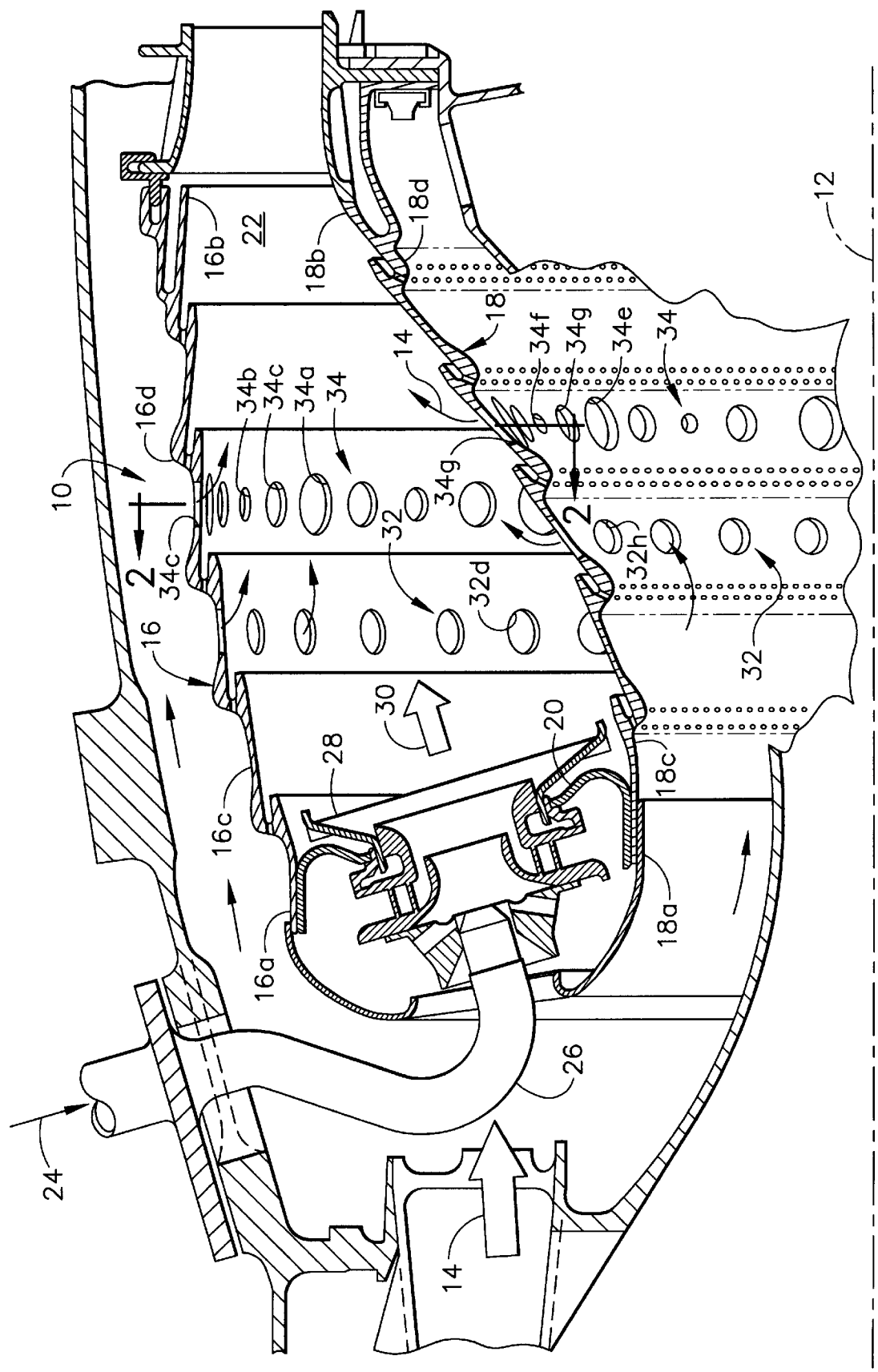
FIG. 1 is an axial sectional view through a portion of an annular combustor having outer and inner liners in accordance with an exemplary embodiment of the present invention.

Illustrated in FIG. 1 is a portion of an annular combustor 10 which is axisymmetrical about an axial or longitudinal centerline axis 12. The combustor is disposed inside an annular casing of a gas turbine engine (shown in part) and receives pressurized air 14 from a conventional compressor (not shown).

The combustor includes a radially outer annular combustion liner 16, and a radially inner annular combustion liner 18 spaced radially therefrom. The two liners have forward ends 16a,18a and axially opposite aft ends 16b,18b. The liner forward ends are suitably joined to an annular dome 20, and the liner aft ends define an annular combustor outlet 22 radially therebetween.

Fuel 24 is introduced into the combustor through a plurality of circumferentially spaced apart carburetors each including a respective fuel injector 26 and cooperating swirler or swirl cup 28. The carburetors may take any conventional form, and the swirl cups 28 typically include rows of swirl vanes or apertures therein for swirling portions of the pressurized air 14 around fuel from the respective injectors to create a fuel and air mixture which is suitably ignited for generating hot combustion gases 30.

In order to protect the combustor from the hot combustion gases, the liners 16,18 are preferably formed in axial segments or panels 16c,1c integrally joined together at conventional film cooling nuggets 16d,18d which include rows of film cooling holes therethrough for providing cooling air in a film along the exposed inner surfaces of the liners as a boundary against the hot combustion gases.

The combustor 10 illustrated in FIG. 1 has a substantially larger burning volume than the CF34-3A combustor disclosed above effected in part by introducing five liner panels instead of four in the previous design, and increasing the radial spacing between the two liners.

However, it was discovered during the development of the larger combustor 10 illustrated in FIG. 1 that a conventional arrangement of dilution holes in the liners would not achieve acceptable combustor performance, including exhaust emissions therefrom.

In accordance with the present invention, each of the liners 16,18 includes a first row of primary dilution holes 32 extending radially through the liners, aft of the forward ends thereof and aft of the dome 20, preferably in the second liner panels. Each liner also includes a second row of secondary dilution holes 34 extending radially through the liners, axially between the corresponding row of primary dilution holes 32 and the liner aft ends at the combustor outlet 22. The secondary dilution holes are preferably close coupled to the primary holes and are therefore preferably disposed in the third liner panels.

The primary dilution holes are generally identified by the numeral 32 used for both the outer and inner liners in view of their common function, and are further differentiated by lower case suffixes hereinbelow. Similarly, the secondary dilution holes are also identified generally by the reference numeral 34 for both liners in view of their common function, and are further differentiated by lower case suffixes hereinbelow.

Figure 2:
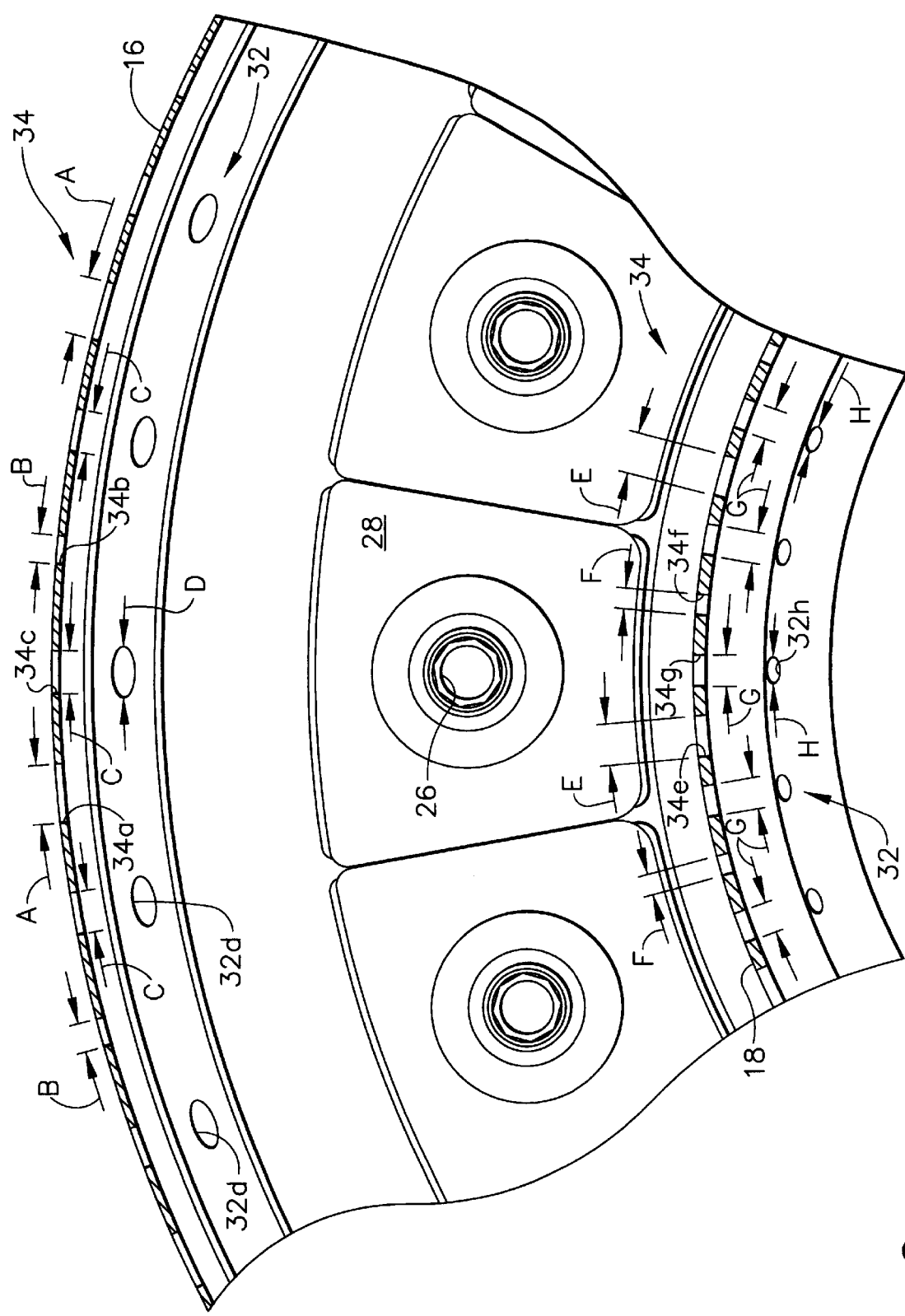
FIG. 2 is an aft-looking-forward radial elevational view of a section of the combustor illustrated in FIG. 1 and taken along line 2—2 to show primary and secondary dilution holes therein.

FIG. 2 illustrates a radial sectional view through a portion of the combustor illustrated in FIG. 1 to show in more particularity a preferred configuration of the primary and secondary dilution holes 32,34. More specifically, the secondary dilution holes 34 vary in size circumferentially to a maximum size offset circumferentially from the corresponding primary holes 32 of each liner. The primary and secondary holes are preferably circular in configuration, and the outer liner 16 includes a secondary dilution hole, designated 34a, which has a maximum diameter A. Correspondingly, the inner liner 18 has a secondary dilution hole, designated 34e which has a maximum diameter E.

The secondary dilution holes 34 in each liner also vary in size circumferentially to a minimum size offset circumferentially from the corresponding primary holes 32. For the outer liner 16 illustrated in FIG. 2, the minimum size secondary hole is designated 34b and has a diameter B, and for the inner liner 18, the minimum size secondary hole is designated 34f having a minimum diameter F.

Furthermore, the secondary holes 34 in each of the liners also vary in size circumferentially to an intermediate size different than the maximum and minimum sizes. For the outer liner 16 illustrated in FIG. 2, the intermediate size secondary holes are designated 34c and have corresponding diameters C, with the intermediate size secondary holes of the inner liner 18 being designated 34g and have corresponding diameters G. In both liners, the intermediate secondary holes 34c,g are axially aligned with corresponding ones of the primary holes 32 without circumferential offset.

As initially illustrated in FIGS. 1 and 2, the first row of primary holes 32 preferably includes two primary holes for each swirl cup 28. In the exemplary embodiment illustrated, there are eighteen swirl cups uniformly spaced apart around the perimeter of the combustor, with thirty-six primary holes in each of the two liners.

Correspondingly, there are preferably four secondary dilution holes 34 for each of the swirl cups 28, for a total of seventy-two secondary dilution holes in each of the two liners.

Figure 3:
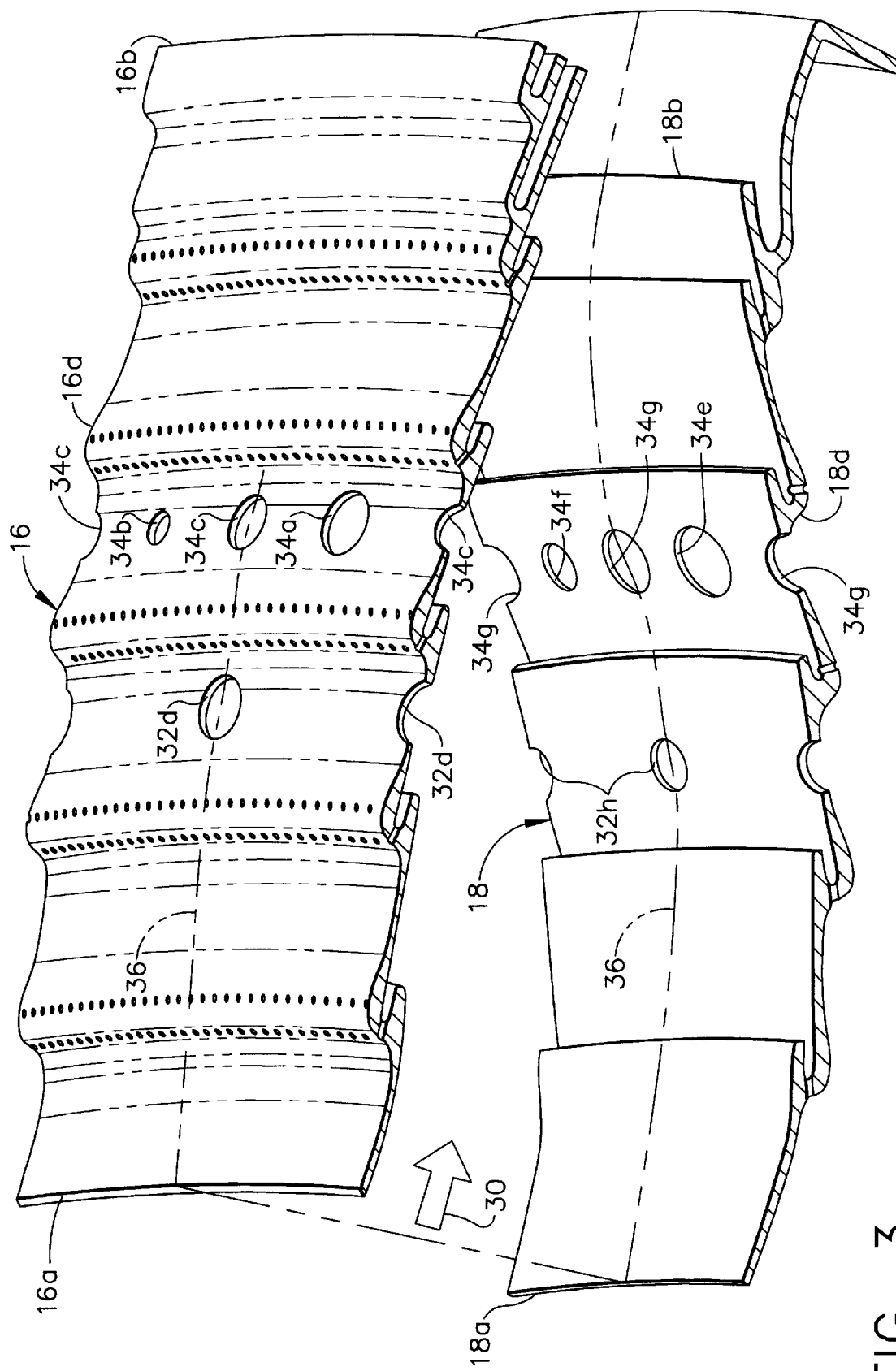
FIG. 3 is an isometric view of isolated portions of the cooperating outer and inner liners illustrated in FIGS. 1 and 2 having primary and secondary dilution holes configured in accordance with an exemplary embodiment of the present invention.

Since the fuel and air mixtures are discharged at the discrete circumferential locations from each of the corresponding swirl cups, corresponding hot streaks are initially developed thereat. Accordingly, the corresponding intermediate sized secondary dilution holes 34c,g are axially aligned with corresponding ones of the primary holes 32 and with the corresponding axial centerlines 36 of each of the swirl cups 28. This is illustrated in more particularity in FIG. 3 with the swirl cup centerlines 36 being illustrated in phantom line in a radially and axially extending plane aligned with the centers of the corresponding primary and secondary holes.

As shown in FIG. 2, the primary holes 32 in each of the liners 16,18 are arranged in groups of two primary holes per swirl cup 28, with one primary hole being axially aligned with the swirl cup centerline, and the other primary hole being disposed equidistantly between two adjacent swirl cups at the mid-cup circumferential location.

Correspondingly, the intermediate sized secondary dilution holes 34c,g of the two liners 16,18 are axially aligned with the primary holes 32 and the swirl cup centerlines without circumferential offset. Since the secondary dilution holes are arranged in groups of four per swirl cup, a second one of the intermediate sized secondary dilution holes 34b,g is located at the mid-cup position between adjacent swirl cups and axially aligned with the mid-cup primary dilution hole 32 in each of the liners.

The minimum size secondary dilution hole 34b,f is disposed at the ¼ cup position between adjacent swirl cups in each of the two liners. And, the maximum size secondary dilution hole 34a,e is disposed at the ¾ cup position between the adjacent swirl cups in each of the liners. These relative positions of the secondary dilution holes are in the clockwise direction illustrated in FIG. 2 aft-looking-forward in the combustor, and repeat therearound.

The intermediate secondary holes 34c in the outer liner 16 preferably have a uniform size C, and similarly the intermediate secondary holes 34g in the inner liner 18 have a uniform size G.

The primary dilution holes 32d in the outer liner 16 preferably have a uniform size D, and similarly the primary dilution holes 32h in the inner liner 18 have a uniform size H.

For the outer liner 16 illustrated in FIG. 2, the primary dilution holes 32d are preferably larger than the intermediate secondary holes 34c, and smaller than the maximum secondary holes 34a For the inner liner 18 illustrated in FIG. 2, the primary holes 32h are preferably smaller than the intermediate secondary holes 34g, and larger than the minimum secondary holes 34f.

Although the immediate secondary holes 34c,g in each of the two liners 16,18 have uniform size in each of those liners, the size C,G of those holes is different between the two liners, being larger in the inner liner than in the outer liner. Although the primary holes 32d,h in each of the liners have a uniform size therein, their sizes D,H are different between the liners, being larger in the outer liner than in the inner liner.

This preferred configuration of the primary and secondary dilution holes in the outer and inner liners has various beneficial effects in combustor performance. Dilution air is preferentially injected into the combustor in a preferred circumferential, axial, and radial distribution cooperating with the swirl cups for limiting exhaust emissions despite the larger burning volume of the combustor, while providing acceptable combustor performance including high altitude starting, lean blowout margin, and profile and pattern factors.

In particular, the circumferentially offset maximum secondary dilution holes 34a,e engage the hot streaks from the swirl cups for reducing peak circumferential temperature with improved pattern factor. And, the relative size distribution between the primary and secondary dilution holes in the outer and inner liners reduce variation in the radial temperature with improved profile factor.

The combination of more efficient liner cooling due to the additional, fifth panel, and the decreased surface-to-volume ratio of the combustor reduces the total cooling air requirement so that more air is available for dilution.

The increased burning volume of the combustor, and corresponding cycle pressure ratio, initially creates the risk of increased NOx emissions, which are limited by the preferred dilution hole pattern described above. The dilution hole pattern is configured to minimize increase in NOx emissions, while minimizing any adverse tradeoff between NOx and CO emissions.

By positioning the primary dilution holes in the second liner panel from the swirl cups, entrainment of primary dilution air into the primary combustion zone immediately aft of the swirl cups is minimized. This reduces adverse effects on altitude starting and lean blowout.

The primary combustion zone between the swirl cups and the row of primary dilution holes may be operated with relatively rich fuel and air mixtures from the carburetors while maintaining acceptable smoke levels. This also permits primary combustion to occur under near-stoichiometric conditions at idle, and providing low CO and unburned hydrocarbon emissions.

At higher power settings, the primary combustion occurs under fuel-rich conditions, which suppresses NOx formation in the primary zone. The primary dilution holes provide sufficient air to dilute the burning combustion gas mixture to be slightly lean of stoichiometric to allow CO burnout, while the secondary dilution holes are close coupled to the primary holes by being disposed in the next aft, third, liner panel, for quenching NOx production.

The relative sizes of the primary and secondary dilution holes and their preferred distribution permits circumferential trimming of hot streaks from the swirl cups to provide a relatively low pattern factor with a correspondingly uniform circumferential temperature distribution. The relative sizes of the primary and secondary dilution holes in the two liners effects an inner-to-outer split of the available pressurized air for controlling the radial exit temperature of the combustion gases with a corresponding profile factor.

Optimization of the dilution trim effected by the primary and secondary dilution holes was conducted analytically and experimentally for maximizing performance thereof. Variation in dilution hole size may be made in alternate embodiments for particular combustor designs. Both NOx and CO emissions may be limited to current stringent requirements therefor, with the combustor enjoying high altitude starting effectiveness with improved combustor performance, including acceptable profile and pattern factors of the combustion gases discharged to downstream turbine stages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured letters patent of the United States is the invention as defined and differentiated in the following claims in which we claim:

1. An annular gas turbine engine combustor liner comprising:
   opposite forward and aft ends;
   a row of primary dilution holes extending radially through said liner aft of said forward end;
   a row of secondary dilution holes extending radially through said liner between said primary holes and said aft end in a plurality of repeating circumferential groups; and
   said secondary holes varying in size circumferentially to a maximum size offset circumferentially from said primary holes in each of said groups.

2. A liner according to claim 1 wherein said secondary holes vary in size circumferentially to a minimum size offset circumferentially from said primary holes in each of said groups.

3. A liner according to claim 2 wherein said secondary holes vary in size circumferentially to an intermediate size different from said maximum and minimum sizes in each of said groups.

4. A liner according to claim 3 wherein said intermediate secondary holes are axially aligned with corresponding ones of said primary holes without circumferential offset.

5. A liner according to claim 4 wherein said intermediate secondary holes have a uniform size.

6. A liner according to claim 5 wherein said primary holes have a uniform size.

7. A liner according to claim 6 wherein said primary holes are larger than said intermediate secondary holes.

8. A liner according to claim 7 wherein said primary holes are smaller than said maximum secondary holes.

9. A liner according to claim 6 wherein said primary holes are smaller than said intermediate secondary holes.

10. A liner according to claim 9 wherein said primary holes are larger than said minimum secondary holes.

11. A gas turbine engine combustor 10 comprising:

radially spaced apart outer and inner annular liners joined at forward ends to an annular dome, and having opposite aft ends defining an annular outlet;

each of said liners having a row of primary dilution holes extending radially therethrough aft of said dome, and a row of secondary dilution holes extending radially therethrough between said primary holes and said outlet in a plurality of repeating circumferential groups; and said secondary holes in each liner vary in size circumferentially to a maximum size offset circumferentially from said primary holes therein in each of said groups.

12. A combustor according to claim 11 wherein said secondary holes vary in size circumferentially to a minimum size offset circumferentially from said primary holes in each of said groups.

13. A combustor according to claim 12 wherein said secondary holes vary in size circumferentially to an intermediate size different from said maximum and minimum sizes in each of said groups.

14. A combustor according to claim 13 wherein said intermediate secondary holes in each liner are axially aligned with corresponding ones of said primary holes without circumferential offset.

15. A combustor according to claim 14 wherein said primary holes in said outer liner are larger than said intermediate secondary holes therein, and said primary holes in said inner liner are smaller than said intermediate secondary holes therein.

16. A combustor according to claim 15 wherein said primary holes in said outer liner are smaller than said maximum secondary holes therein, and said primary holes in said inner liner are larger than said minimum secondary holes therein.

17. A combustor according to claim 14 further comprising a row of circumferentially spaced apart swirl cups disposed in said dome and axially aligned with corresponding ones of said intermediate secondary holes of said outer and inner liners.

18. A combustor according to claim 17 wherein:

said intermediate secondary holes in each liner have a uniform size, being different between said liners; and said primary holes in each liner have a uniform size, being different between said liners.

* * * * *